US005317458A

United States Patent [19]
Van Leeuwen et al.

[11] Patent Number: 5,317,458
[45] Date of Patent: May 31, 1994

[54] APPARATUS FOR RECORDING A COUNT SIGNAL IN A FIXED LOCATION REGARDLESS OF TRANSPORT VELOCITY OF RECORD CARRIER

[75] Inventors: Pieter G. Van Leeuwen; Albert M. A. Rijckaert, both of Eindhoven, Netherlands

[73] Assignee: U.S. Philips Corporation, New York, N.Y.

[21] Appl. No.: 3,366

[22] Filed: Jan. 12, 1993

[30] Foreign Application Priority Data

Jan. 16, 1992 [EP] European Pat. Off. ......... 92200110.2

[51] Int. Cl.$^5$ ........................ G11B 5/09; G11B 27/02
[52] U.S. Cl. ....................................... 360/48; 360/50; 360/51; 360/14.3
[58] Field of Search ....................... 360/13, 14.1, 14.2, 360/14.3, 48, 49, 50, 51, 72.2, 74.4, 73.05

[56] References Cited

U.S. PATENT DOCUMENTS 4,707,749 11/1987 Nishijima et al. .................. 360/74.4
4,819,087 4/1989 Takeuchi et al. ..................... 360/13

OTHER PUBLICATIONS

IEC Standard Publication, No. 461, 1986, pp. 31–54.

Primary Examiner—Donald Hajec
Assistant Examiner—T. N. Forbus, Jr.
Attorney, Agent, or Firm—Edward W. Goodman

[57] ABSTRACT

An arrangement for recording an information signal in a track ($T_0, T_1, \ldots$) on a record carrier (1), includes an input (20) for receiving the information signal, signal processing circuitry (21) for processing the information signal such that it can be recorded in the track, counting device (23) for counting and for generating an array of subsequent different count signals and for supplying the count signals to an output (24), recording apparatus (25, 26, 27) having at least one recording head (26) for recording the processed information signal in a track on the record carrier, and for recording the count signals in a track on the record carrier and a transport apparatus (34,35) for transporting the record carrier with a certain transport velocity ($v_t$) in a longitudinal direction of the record carrier. The counting device (23) is adapted to supply count signals such that, independent of the value of the transport velocity during recording, a count signal is recorded in a substantially fixed location, viewed in the longitudinal direction of the record carrier, on said record carrier. Further, in the case that the arrangement is capable of recording a first video signal which is based on 25 pictures per second and of recording a second video signal which is based on 30 pictures per second, the following relation exists between the supply rate $F_s$ of the subsequent different count signals by the count signal generator (23), and D, being the difference between subsequent different count signals generated:

$$F_s \times D = constant,$$

for the recording of the first video signal as well as the second video signal, and where the transport velocity has been kept constant.

15 Claims, 4 Drawing Sheets

APPARATUS FOR RECORDING A COUNT SIGNAL IN A FIXED LOCATION REGARDLESS OF TRANSPORT VELOCITY OF RECORD CARRIER

BACKGROUND OF THE INVENTION

1. Field of the Invention

The invention relates to an arrangement for recording an information signal in a track on a record carrier, comprising an input for receiving the information signal, signal processing means for processing the information signal such that it can be recorded in the track, count signal generating means for generating an array of subsequent different count signals and for supplying the different count signals to an output with a certain supply rate, recording means, having at least one recording head, for recording the processed information signal in a track on the record carrier, and for recording the count signals in a track on the record carrier, transport means for transporting the record carrier with a certain transport velocity in a longitudinal direction of the record carrier.

2. Description of the Related Art

Such an arrangement is known in the form of a helical scan videorecorder which is also capable of recording a VITC time code on the record carrier. The VITC code is described in the IEC standard publication no. 461 of 1986, see page 31 to 54. When a recording takes place in the known arrangement, the count signal generating means generates the count signals with incrementally increasing values, starting from a certain value which is preferably zero, with fixed increments. In this way, count signals are generated that are used as a time code, which count signals are recorded in the slant tracks on the record carrier. The time code recorded on the record carrier can be used for location purposes.

The known arrangement has the disadvantage that locating a certain position in the length direction of the record carrier sometimes fails.

SUMMARY OF THE INVENTION

It is an object of the invention to provide an arrangement for recording an information signal in a track on a record carrier, with which locating a certain position on the record carrier is possible with less ambiguity.

To that purpose, the arrangement according to the invention is characterized in that the count signal generating means are adapted to supply subsequent different count signals such that, independent of the value of the transport velocity during recording, a count signal is recorded in a substantially fixed location, viewed in the longitudinal direction of the record carrier, on said record carrier.

The invention is based on the following recognition. Generating the count signals with fixed increments and with a fixed supply rate, as is realized in the prior art arrangement, means that for all transport velocities of the record carrier during the recording of an information signal, the array of different count signals generated is the same as a function of time. Suppose that the information signal can be recorded in a short play or a long play mode of the arrangement. In the long play mode, the record carrier transport velocity has a certain nominal value. In the short play mode, the record carrier transport velocity is higher, say twice the nominal velocity. Identical count signals will not be recorded in the same location for both velocities. In fact, the count signals recorded in the short play mode will substantially coincide with the even or the uneven count signals only of the array of count signals when recorded in the long play mode. This means that the count signals recorded are not location-related.

A further disadvantage is that, when overwriting a signal recorded earlier in the long play mode, by a signal in the short play mode, the sequence of count signals at the end of the insert is not continuous anymore with the sequence of count signals in the original recording following the insert. Further, the possibility arise that identical count signals can occur in the insert and the original recording following the insert. This makes the localization of a position on the record carrier intricate.

In accordance with the invention, count signals are recorded that have a direct relationship to a corresponding position on the record carrier where they are recorded. This means that, independent of the transport velocity of the record carrier during recording, the same count signal will be recorded on a specific location on the record carrier. This makes it possible to address a location on the record carrier in an unambiguous and unique way. This makes it possible to determine, in every position on the tape, how far (in meters) the begin position and the end position of the tape are away from the present location. Moreover, this makes it possible to determine the 'time-used' and the 'time-left' for the present location, for any mode (such as: short play, long play or super long play) in which the arrangement can be used.

In order to realize this, the arrangement may be characterized in that, to that purpose, the count signal generating means are further adapted to supply such count signals, that the difference between subsequent count signals in the array of different count signals is substantially proportional to the transport velocity of the record carrier during recording. This results in lesser count signals being recorded on the record carrier in the case of higher transport velocities, the increment value between two successive different count signals being larger. This embodiment is of special use in the case that a recording of the information signal in slant tracks on a record carrier is carried out.

Another possibility is that the arrangement is characterized in that, to that purpose, the count signal generating means are further adapted to supply the subsequent different count signals with a supply rate which is substantially proportional to the transport velocity of the record carrier during recording. In this case, the increment value can be kept constant for the various transport velocities, and the same array of count signals is recorded on the record carrier, independent of the transport velocity during recording.

In a situation in which a first information signal has been recorded in a first portion on the record carrier, the arrangement be further characterized in that, for recording a second information signal directly after the first information signal in a second portion on the record carrier, the arrangement is adapted to read the count signal lastly recorded in the first portion on the record carrier, to supply the count signal lastly recorded to the count signal generating means, that for recording the second information signal, the count signal generating means are adapted to generate count signals starting from the count signal lastly recorded in the first portion. This has the advantage that the sequence of count signals recorded on the record carrier will be continuous over the boundary between the first portion and the beginning of the second portion of the record carrier. Moreover, in the case that the second information signal is an insert to be recorded over an original recording, this results in a continuous sequence of count signals over the boundary separating the end of the insert and the part of the original recording following the insert.

An arrangement for recording a first information signal in the form of a video signal based on 25 pictures per second and for recording a second information signal based on 30 pictures per second may be characterized in that the arrangement is adapted to receive a first information signal in the form of a videosignal based on 25 pictures per second or a second information signal in the form of a videosignal based on 30 pictures per second and to record said first or second information signal in slant tracks on the record carrier, the arrangement further comprising clock extracting means for extracting a clock signal from the first or second information signal applied to the input and for supplying the clock signal to an output, the clock signal being substantially proportional to the number of pictures per second in the first or second information signal, the output of the clock extraction means being coupled to a clock signal input of the count signal generating means, the count signal generating means being adapted to supply subsequent different count signals in response to the clock signal received, with a supply rate which is substantially proportional to the frequency of the clock signal, and with such difference between subsequent different count signals that the following relation is met, independent of the first or the second information signal being recorded on the record carrier, and with the transport velocity of the record carrier during recording of said first or second information signal being the same:

$$F_s \times D = constant,$$

where $F_s$ is the supply rate and D is the difference between subsequent different count signals.

This has the advantage that also for recording different kind of information signals in the form of video signals which are based on 25 or 30 pictures per second, count signals are recorded which are location related.

BRIEF DESCRIPTION OF THE DRAWINGS

These and other aspects of the invention will be apparent from, and further explained with reference to the embodiment described in, the following figure description, in which.

DESCRIPTION OF THE PREFERRED EMBODIMENT

Figure 1:
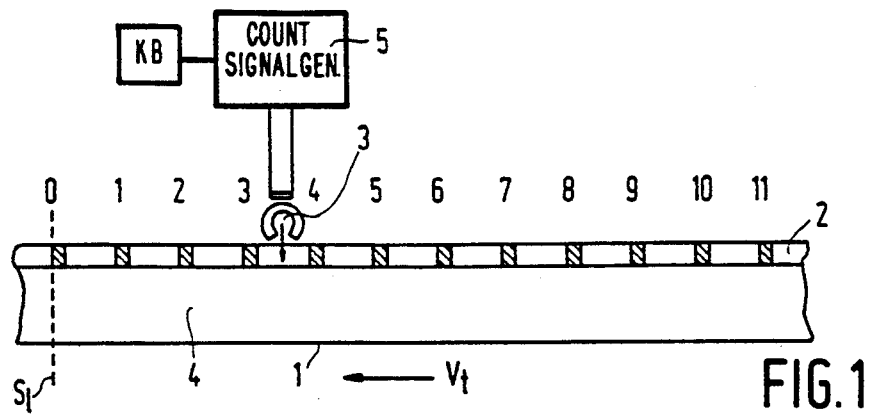
FIG. 1 shows a record carrier having the count signals recorded in a longitudinal track on the record carrier.

FIG. 1 discloses schematically a longitudinal record carrier 1 in the form of a tape, on which count signals are recorded in a track 2 which is located longitudinally along the tape, along one side of the tape. The hatched portions in the track indicate the locations where the count signals are recorded in the track. On the remaining portion 4, a video signal could have been recorded in slant tracks on the tape. From FIG. 1, it is clear that count signals representative of the numbers running from zero up to 11 are recorded at equidistant locations in the track 2, by means of the head 3. The recording of the count signals under various transport velocities of the tape will be described below.

Figure 2A:
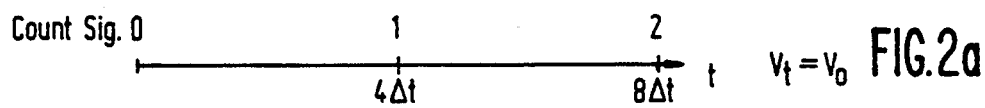
FIGS. 2a-2c show the generation of the count signals for three different transport velocities of the record carrier.
Figure 2B:
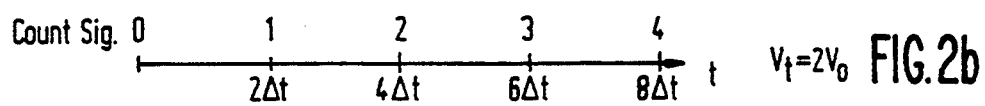
Figure 2C:
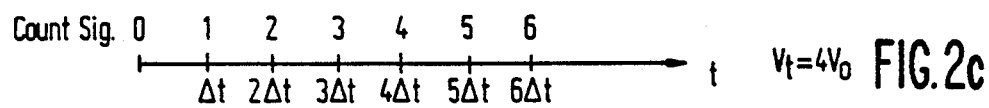

Assume that, in a short play mode, the transport velocity $v_t$ of the tape equals $4 v_0$, where $v_0$ equals a certain nominal velocity. Count signals are generated by a count signal generator 5, controlled by keyboard KB, as indicated in FIG. 2c. Count signals representative of the numbers 0, 1, 2, ... are generated with a certain supply rate which is proportional to $1/\Delta t$. Consequently, count signals are generated at time intervals $n.\Delta t$, where n is an integer running up from 0. Recording the count signals thus generated in in the track realizes the equidistant count signals recorded in the track in the way as shown in FIG. 1.

Assume now that in a long play mode the tape is transported along the head 3 with a transport velocity $v_t$ which equals $2v_0$. Count signals are generated by the count signal generator 5 as indicated in FIG. 2b. Count signals representative of the numbers 0, 1, 2, ... are generated with a certain supply rate which is now proportional to $1/2 \Delta t$. Consequently, count signals are generated at time intervals $n.2\Delta t$, where n is again an integer running up from 0. Recording the count signals thus generated in the track realizes the equidistant count signals recorded in the track in the way as shown in FIG. 1. The reason for this is that although the supply rate of the count signals is a factor of 2 lower, also the transport velocity of the tape is a factor of 2 lower. Therefore, the count signals are recorded in the same locations, viewed in the longitudinal direction of the track, as in the short play mode.

Assume now that in a super long play mode the tape is transported along the head 3 with a transport velocity $v_t$ which equals $v_0$. Count signals are generated by the count signal generator 5 as indicated in FIG. 2a. Count signals representative of the numbers 0, 1, 2, ... are generated with a certain supply rate which is now proportional to $\frac{1}{4}\Delta t$. Consequently, count signals are generated at time intervals $n.4\Delta t$, where n is again an integer running up from 0. Recording the count signals thus generated in the track realizes the equidistant count signals recorded in the track in the way as shown in FIG. 1. The reason for this is that although the supply rate of the count signals is again a factor of 2 lower, also the transport velocity of the tape is again a factor of 2 lower. Therefore, the count signals are recorded in the same locations, viewed in the longitudinal direction of the track, as in the short play mode and the long play mode.

The conclusion should thus be that, starting from a fixed starting location, indicated by the broken line sl, which can be the beginning of the tape, count signals are recorded in the track in such locations, viewed in the longitudinal direction of the track, that, independent of the transport velocity of the tape during recording, a count signal is always recorded in the same location in the track.

In a second embodiment, the generation of the count signals in the super long play mode is the same as given in the first embodiment discussed above. Consequently, count signals are recorded in the track 2 as shown in FIG. 1. In the long play mode, however, the count signal generator 5 is adapted to generate count signals representative of the numbers 0, 2, 4, 6, ... Those count signals are generated at time intervals $n.4\Delta t$, that is, at the same time intervals as in the super long play mode. The supply rate of the count signals has thus remained the same as in the super long play mode. The difference between each time two successive different count signals generated in the long play mode is now twice the difference between two successive different count signals generated in the super long play mode. As a result, only the count signals 0, 2, 4, 6, ... are recorded in the track 2.

In the short play mode, however, the count signal generator 5 is adapted to generate count signals representative of the numbers 0, 4, 8, ... Those count signals are generated at time intervals $n.4\Delta t$, that is, at the same time intervals as in the long play and the super long play mode. The supply rate of the count signals has thus remained the same as in the long play and the super long play mode. The difference between each time two successive count signals generated in the short play mode is now twice the difference between two successive count signals generated in the long play mode. As a result, only the count signals 0, 4, 8, 12, ..., are recorded in the track 2.

The conclusion should thus again be that, starting from a fixed starting location, indicated by the broken line sl, which can be the beginning of the tape, count signals are recorded in the track in such locations, viewed in the longitudinal direction of the track, that, independent of the transport velocity of the tape during recording, a count signal is always recorded substantially in the same location in the track. The number of count signals recorded in the long play mode is however half the number of count signals located in the super long play mode, and the number of count signals recorded in the short play mode is half the number of count signals located in the long play mode. The count signals 0, 4, 8, 12, ..., are always recorded in the same locations in the track.

Figure 3A:
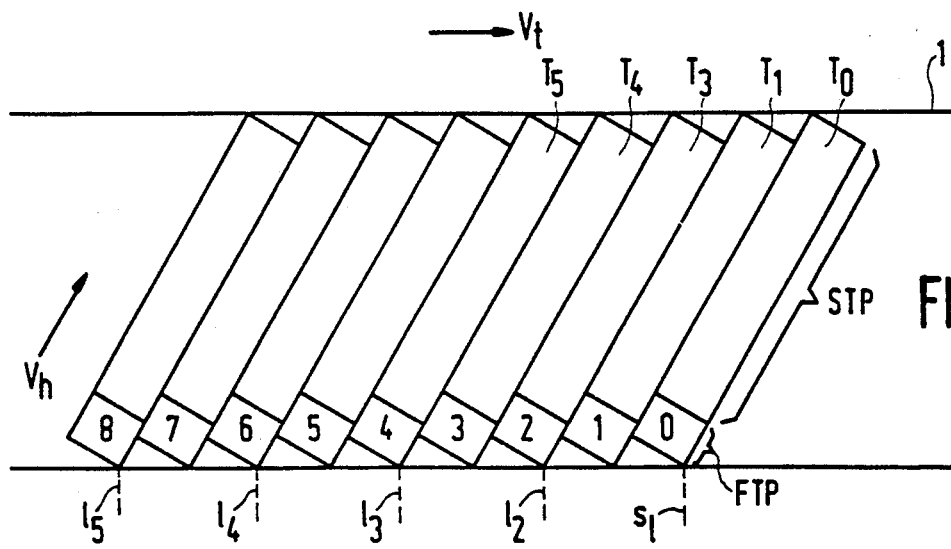
FIGS. 3a-3c show a record carrier having the count signals recorded together with the information signal in slant tracks on the record carrier.
Figure 3B:
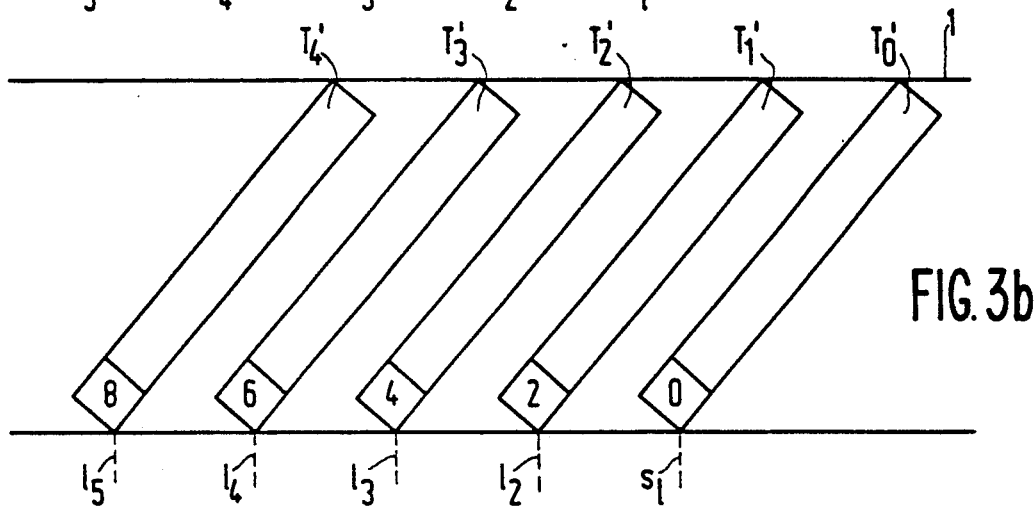
Figure 3C:
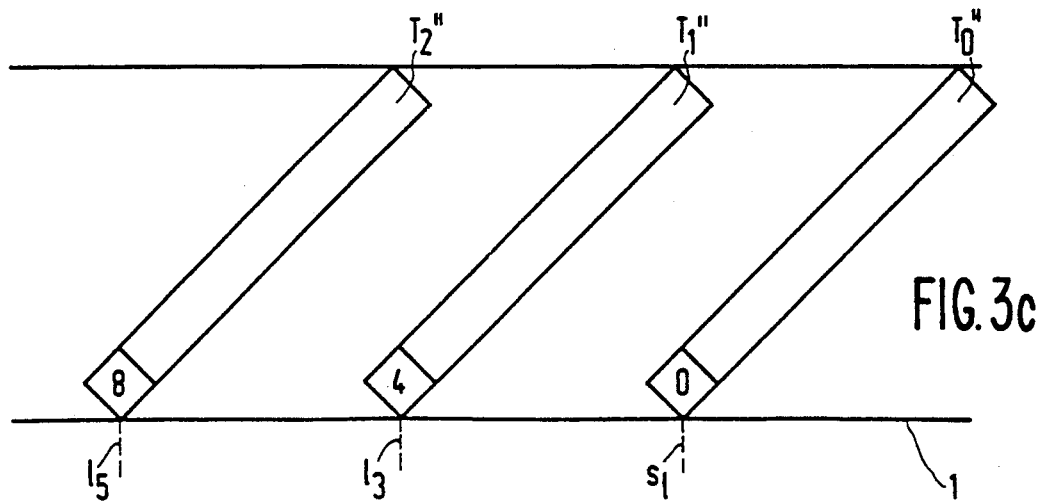

In a third embodiment, the count signals are recorded in the same slant tracks in which a video signal can be recorded by means of a helical scan recorder. This is indicated in FIGS. 3a–3c. In FIG. 3a, the video signal is recorded on tape in the super long play mode of the arrangement, when the transport velocity $v_t$ of the tape equals $v_0$. Rotating heads, positioned on a rotating head drum record the video signal in the slant tracks that lie adjacent each other, as indicated in FIG. 3a. $v_h$ indicate the direction of movement of the heads across the tape. Count signals, indicated by the numbers 0, 1, 2, 3, ... etc., are recorded in the tracks by the same rotating heads. The count signals are recorded in a first track part FTP located at the beginning of each track. The video signal is recorded in a second track part STP of a track. As can be seen in FIG. 3a, the count signals represented by the numbers 0, 1, 2, 3, ... etc., are recorded in the first track parts of the subsequent tracks $T_0$, $T_1$, $T_2$, ... etc. In order to realize such recording of the count signals, the count signal generator should generate the subsequent count signals with a certain supply rate such that the count signals are available for recording in the first track parts FTP of the subsequent tracks.

Assume now that in a long play mode the tape is transported with a transport velocity $v_t$ which equals $2v_0$. Recording the video signal on the tape 1 realizes the tracks $T_0'$, $T_1'$, $T_2'$, $T_3'$, ... etc., as shown in FIG. 3b. As the transport velocity is twice the transport velocity in the super long play mode, the tracks now have a spacing between each other. The count signal generator now generates subsequent count signals with the same supply rate as in the super long play mode. The difference between, each time, two subsequent count signals is twice the difference between two subsequent count signals generated in the super long play mode. That means that count signals 0, 2, 4, 6, ... etc., are generated and are recorded in the subsequent tracks $T_0'$, $T_1'$, $T_2'$, $T_3'$, ... etc., as shown in FIG. 3b.

Assume now that in the short play mode the tape is transported with a transport velocity $v_t$ which equals $4v_0$. Recording the video signal on the tape 1 realizes the tracks $T_0''$, $T_1''$, $T_2''$, ... etc., as shown in FIG. 3c. As the transport velocity is four times the transport velocity in the super long play mode, the tracks now also have a spacing between each other. The spacing between two subsequent tracks in the short play mode is twice the spacing between the tracks in the long play mode. The count signal generator again generates subsequent count signals with the same supply rate as in the super long play mode. The difference between, each time, two subsequent count signals is four times the difference between two subsequent count signals generated in the super long play mode. That means that count signals 0, 4, 8, ... etc., are generated and are recorded in the subsequent tracks $T_0''$, $T_1''$, $T_2''$, ... etc., as shown in FIG. 3c.

When comparing the FIGS. 3a, 3b and 3c, it can be recognized that the count signals are recorded in a location related way, in that, starting from a fixed starting location, indicated by the line sl, which can be the beginning of the tape, count signals are recorded in the track in such locations, viewed in the longitudinal direction of the tape, that, independent of the transport velocity of the tape during recording, a count signal is always recorded in the same location on the tape. The number of count signals recorded in the long play mode is however half the number of count signals generated in the super long play mode, and the number of count signals recorded in the short play mode is half the number of count signals generated in the long play mode. The count signals 0, 2, 4, 6, 8, ..., are always recorded in the same locations, sl, $l_2$, $l_3$, $l_4$, $l_5$, ..., respectively, along the tape.

It should be noted that FIGS. 3a–3c show only schematically the location and the size of the tracks. In practice, the open spaces between the tracks shown in FIGS. 3b and 3c will be filled by using wider tracks, in order to improve the signal-to-noise ratio, or will be filled by inserting additional tracks having additional information recorded in them, e.g. in order to improve the picture quality of the video signal recorded.

Figure 4:
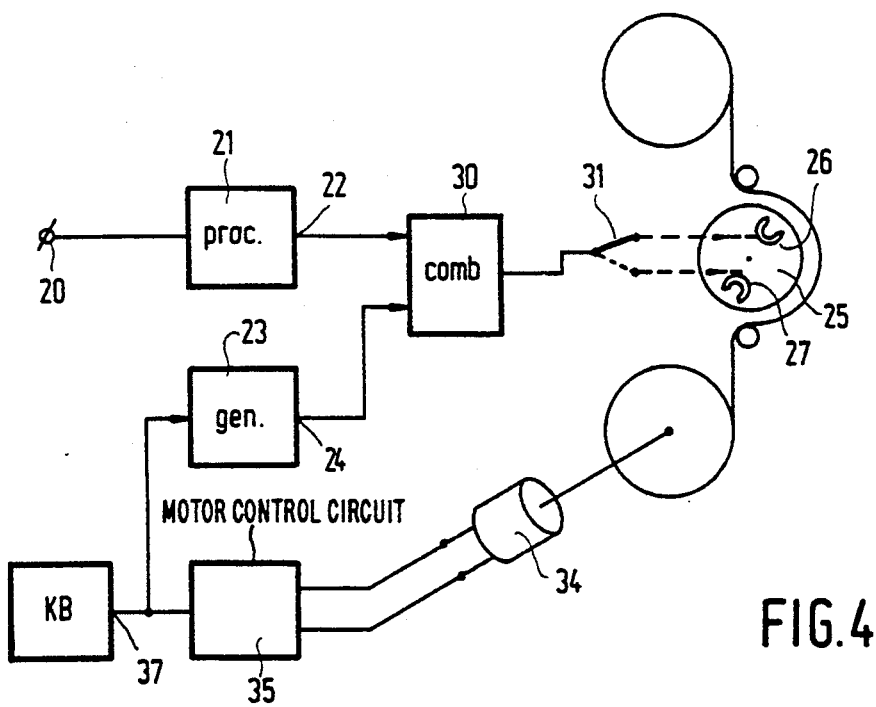
FIG. 4 shows an embodiment of the recording arrangement according to the invention.

FIG. 4 discloses, schematically, an embodiment of the recording arrangement according to the invention. The arrangement is capable of recording a video signal and the count signals together in slant tracks on the tape, as indicated by FIGS. 3a-3c. The arrangement includes an input terminal 20 for receiving an information signal, such as a video signal, to be recorded on the record carrier. The input terminal 20 is coupled to an input of a signal processing means 21. In the signal processing means 21, the video signal is processed in a well known way so as to bring it in a suitable form for recording on the record carrier. The processed video signal will be available at the output 22. The arrangement further comprises count signal generator 23, which generates subsequent count signals with a certain supply rate at an output 24. The arrangement is in the form of a helical scan recorder, which means that the video signal is recorded by means of at least one rotating recording head located on a rotating head drum 25. Two recording heads 26, 27 are shown located at 180° relative to each other around the circumference of the head drum 25. The video signal present at the output 22 of the processing means 21 is applied to the heads in a well known way via switching means 31, so that the video signal can be recorded on the tape, in the way indicated by FIG. 3.

The output 22 of the processing means 21 and the output 24 of the count signal generator 23 are coupled to respective inputs of a signal combination unit 30, whose output is coupled to the switching means 31. The signal combination unit 30 is adapted to combine the signals applied to its inputs in such a way that the count signals and the video signal are recorded in the tracks, so that the count signals are recorded in the first track parts FTP, and the video signal is recorded in the second track parts STP of the tracks.

Tape transport means are provided, in the form of a tape transport motor 34 and a motor control circuit 35 that provides the motor with the correct supply signal, so as to drive the motor with various motor speeds. A keyboard KB is provided which enables the user to control the recording mode of the arrangement. In this way, the user can switch the arrangement in a short play, a long play or a super long play mode. Under the influence of control signals applied to the motor control circuit 35 via the line 37, the motor control circuit generates the correct supply signal so that the motor runs at a certain speed so as to realize the tape transport speed for the short play, the long play or the super long play mode respectively.

The control signals supplied via the line 37 to the motor control circuit 35 are also applied to the count signal generator 23. Under the influence of those control signals, the count signal generator 23 generates either the array of count signals 0, 1, 2, 3, ... etc., in the super long play mode, or the array of count signal 0, 2, 4, 6, ... etc., in the long play mode, or the array of count signals 0, 4, 8, ... etc., in the short play mode of the arrangement, as indicated in FIGS. 3a-3c. As has been said before, the supply rate of the count signals is the same for the three modes.

Another embodiment of the arrangement, which is not further shown in a figure, has a separate recording head for recording count signals in a separate track, as indicated in FIG. 1. The output of the count signal generator 23 is then coupled to that separate recording head. The count signal generator can supply the count signals in the manners discussed with reference to FIGS. 1 and 2a-2c.

Figure 5A:
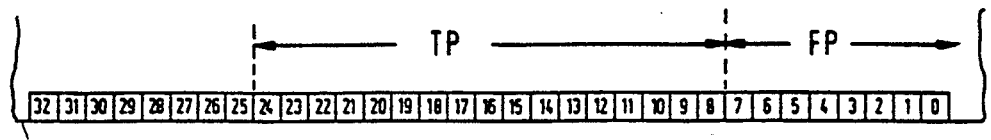
FIGS. 5a-5c show the realization of a perfect insert for different transport velocities of the record carrier.
Figure 5B:
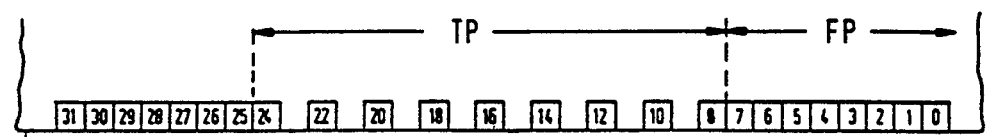
Figure 5C:
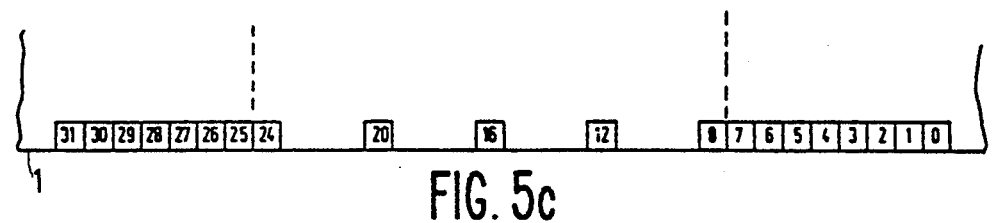

FIGS. 5a-5c disclose the editing of a tape recorded earlier, by realizing a perfect insert. FIG. 5a shows the tape 1 as earlier recorded. Only the count signals, as recorded in a track running along an edge of the tape, are shown. It is assumed that the earlier recording was carried out with the arrangement being in the super long play mode.

In an insert mode of the arrangement a new information signal needs to be recorded in a second portion TP, following a first portion FP on the tape. The method of recording the insert is as follows. It is assumed that the insert should start at a location given by count signal number 8. If this value is known, the arrangement transports the tape until that position is reached. This can be done by reproducing the count signals until the count signal number 7 has been reached. Then the arrangement switches over to recording. The count signal generator 23 is preset to a value 8, and supplies this count signal to the output at the starting moment of the recording. Thus the count signal 8 is recorded as the first count signal in the second portion TP on the tape. It is assumed that the supply rate of the count signal generator for supplying the count signals is fixed for the various transport speeds of the tape. Further, it is assumed that the recording of the insert is carried out with the arrangement being in the super long play mode. As a result, subsequent count signals 9, 10, 11, 12, ... etc., are generated and recorded on the tape. The recording of the insert is stopped at the location corresponding to count signal number 24. As the count signals are generated in a location related way, the count signal 24 lastly recorded during the insert mode is recorded at the same location as the count signal number 24 previously recorded. This results in a continuous sequence of count signals over the boundary separating the end of the insert and the part of the original recording following the insert, see FIG. 5a.

Now it is assumed that the insert is carried out with the arrangement being switched in the long play mode. As the supply rate of the count signal generator is fixed, count signals are generated during the insert mode, with a difference between subsequent count signals which is twice the difference between the count signals in the super long play mode. Therefore, count signals 8, 10, 12, 14, 16, 18, 20, 22 and 24 are generated during the recording of the insert in the second portion TP of the tape. FIG. 5b shows the recording of the insert, more specifically the recording of the count signals in the second portion TP. Again the result is a continuous sequence of count signals over the boundary separating the end of the insert and the part of the original recording following the insert.

Now it is assumed that the insert is carried out with the arrangement being switched in the short play mode. As the supply rate of the count signal generator is fixed, count signals are generated during the insert mode, with a difference between subsequent count signals which is four times the difference between the count signals in the super long play mode. Therefore, count signals 8, 12, 16, 20 and 24 are generated during the recording of the insert in the second portion TP of the tape. FIG. 5c shows the recording of the insert, more specifically the recording of the count signals in the second portion TP. Again the result is a continuous sequence of count signals over the boundary separating the end of the insert and the part of the original recording following the insert.

When comparing the FIGS. 5a, 5b and 5c, it can be concluded that the count numbers recorded during the recording of the insert, are always recorded on the same location. Therefore, the localization of a specific position on the tape remains possible in an unambiguous way.

Figure 6:
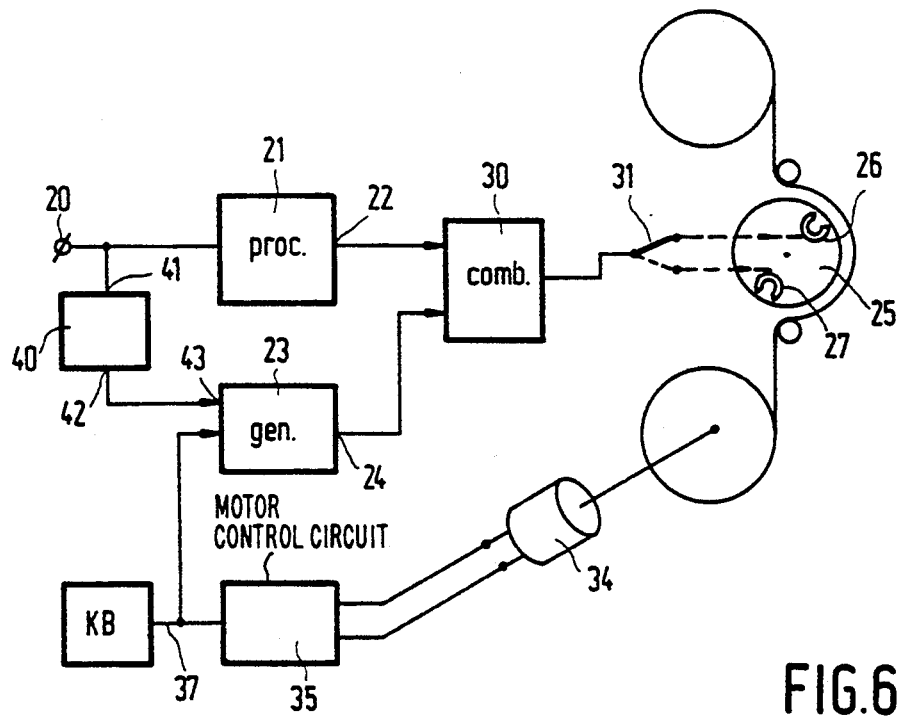
FIG. 6 shows an arrangement for recording a video signal based on 25 pictures per second and for recording a video signal based on 30 pictures per second.
Figure 7A:
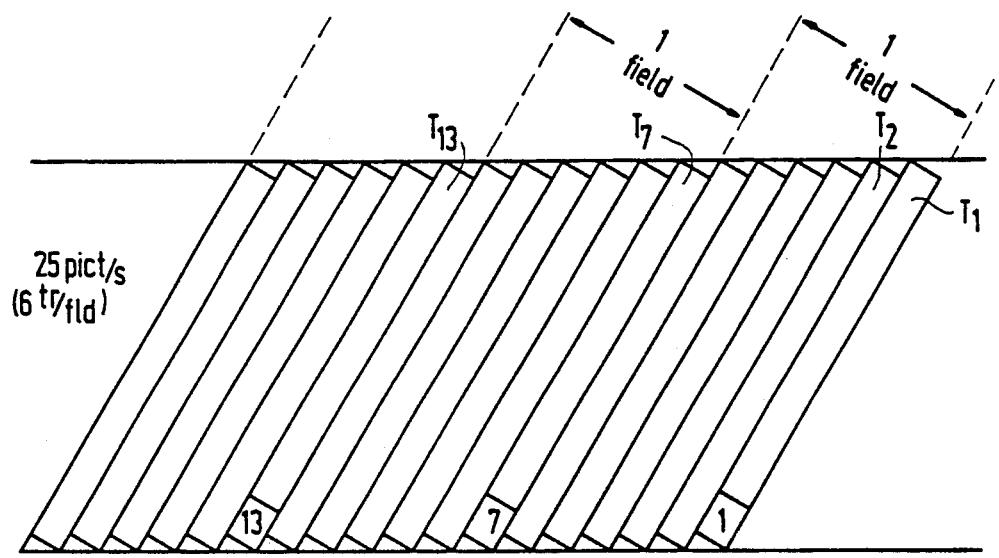
FIGS. 7a and 7b show the track pattern obtained during the recording of the video signal with 25 or 30 pictures per second respectively.
Figure 7B:
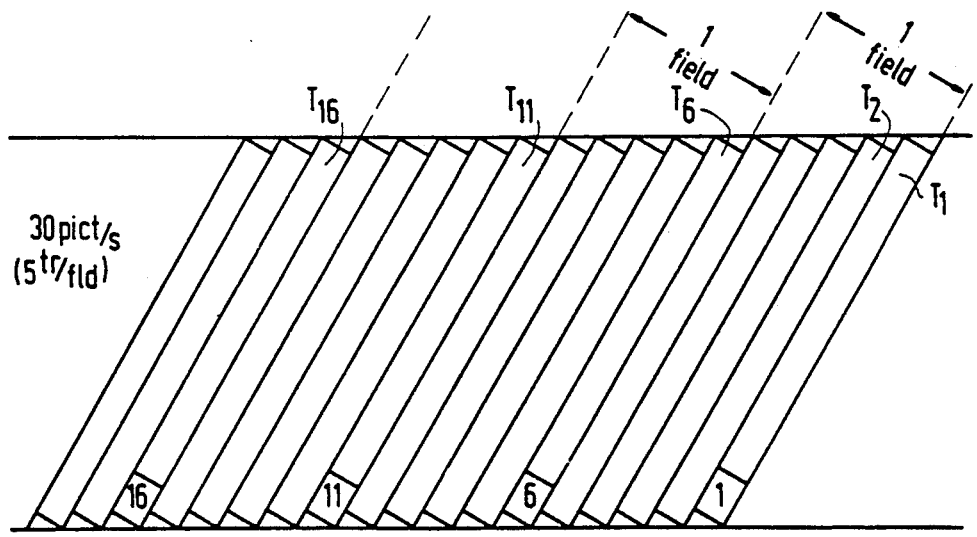

FIG. 6 discloses an embodiment of an arrangement which is capable of recording a first video signal which is based on 25 pictures per second and of recording a second video signal which is based on 30 pictures per second on the record carrier 1. FIGS. 7a and 7b show the tracks in which the first video signal (FIG. 7a) and the second video signal (FIG. 7b) have been recorded. The transport velocity of the record carrier has been assumed to be the same in both cases. In the case of the first video signal the information contained in one picture (which comprises two fields) is recorded in 12 tracks, or the information contained in one field is recorded in 6 consecutive tracks. In the case of the second video signal, the information contained in one picture is recorded in 10 tracks, or the information in one field is recorded in 5 tracks. This means that for both situations 300 tracks of video information are recorded per second. The arrangement of FIG. 6 shows a substantial resemblance with the arrangement of FIG. 4. A clock extracting means 40 are provided, having an input 41 coupled to the input terminal, and an output 42 coupled to a further clock input 43 of the count signal generator 23. The arrangement, especially the processing unit 21, is adapted to detect whether a first video signal or a second video signal is applied to the input 20. The video information in one field of the first video signal is recorded in 6 consecutive tracks. The video information of one field of the second video signal is recorded 5 consecutive tracks, as has been shown in FIGS. 7a and 7b, respectively.

The clock extracting means 40 extract a clock signal which is substantially proportional to the number of pictures per second included in the first or the second video signal. In response to the clock signal generated by the clock extracting means 40 and supplied to the input 43, the count signal generator 23 generates consecutive different count signals with a supply rate $F_s$ such that in both cases the following relation is met:

$$F_s \times D = \text{constant},$$

where D is the difference between consecutive different count signals generated. The tape transport velocity is assumed to be the same for both cases. As can be seen in FIG. 7a, the count signal generator 23 generates count signals 1, 7, 13, ..., with such a supply rate that they are recorded in the tracks $T_1$, $T_7$, $T_{13}$, ..., respectively. As can be seen in FIG. 7b, the count signal generator 23 generates count signals 1, 6, 11, 16, ..., with such a supply rate that they are recorded in the tracks $T_1$, $T_6$, $T_{11}$, $T_{16}$, ..., respectively.

In the case that the tape transport velocity is different in both cases, the following relation should be met:

$$F_s \times D/v_t = \text{constant},$$

where $v_t$ is the tape transport velocity.

It should be noted that in the embodiment of FIGS. 6a, 7a and 7b signal '1' can be included in one or more of the tracks $T_2$ to $T_6$ (FIG. 7a), or $T_2$ to $T_5$ (FIG. 7b) as well. In the same way, a count signal '7' can be included in one or more of the tracks $T_8$ to $T_{12}$ (FIG. 7a), and a count signal '6' can be included in one or more of the tracks $T_7$ to $T_{10}$ (FIG. 7b).

It should be made clear that the supply rate is defined as the rate of supply with which consecutive different count signals are supplied. The supply rate in the embodiment of FIG. 7a is thus the supply rate with which the count signals 1, 7, 13, ... c are supplied, for recording in the tracks $T_1$, $T_7$ and $T_{13}$, respectively. If additional count signals "1" would have been supplied for recording in the tracks $T_2$ to $T_6$, additional count signals "7" for recording in the tracks $T_8$ to $T_{12}$, ... etc., this does not affect the supply rate as defined above. More generally it can be said that, if an array of count signals 0,0, ..., 0,1,1, ..., 1,2,2, ..., 2,3,3, ... etc., is generated, where each time a different count signal 0,1,2,3, ... etc., generated is repeated n times, the supply rate of the different count signals is defined as the supply rate with which the first ones of the n times repeated count signals 0,1,2, ... etc., are generated.

It is to be noted that the invention is not limited to the embodiments disclosed in the present figure description. The invention equally applies to those embodiments which differ from the embodiments disclosed in aspect which are not relevant to the invention. As an example, the information signal can be an analog or a digital information signal. It can be an audio or a video signal. The information signal can be recorded in one or more longitudinal tracks on the record carrier, or can be recorded in slant tracks on the record carrier.

The invention described in the foregoing thus aims at recording count signals in a track on a record carrier. The count signals are recorded such that a count signal is recorded on a corresponding location on the record carrier, independent of the transport velocity of the record carrier during recording of the count signals. As a result locations on the record carrier can be addressed in a non-ambiguous and unique way. Read-out of a count signal at any location on the record carrier gives the possibility to determine the 'time-used' of the record carrier up till that location, and the 'time-left' of the record carrier starting from that location until the end of the record carrier, for any velocity with which the record carrier can be transported.

We claim:

1. Arrangement for recording an information signal in tracks on a record carrier, comprising:
   an input for receiving the information signal;
   signal processing means for processing the information signal such that it can be recorded in the tracks;
   count signal generating means for generating at least one array of subsequent different count signals and for supplying the at least one array of subsequent different count signals to an output with a certain supply rate;
   recording means for recording the information signal processed by said signal processing means in the tracks on the record carrier, and for recording the count signals in the tracks on the record carrier, said recording means having at least one recording head; and
   transport means for transporting the record carrier with a certain transport velocity in a longitudinal direction of the record carrier, characterized in that, the count signal generating means are to supply the at least one array of subsequent different count signals such that, independent of the value of the transport velocity during recording, each respective count signal of said subsequent different count signals is recorded on said record carrier in a substantially fixed respective location, viewed in the longitudinal direction of the record carrier.

2. Arrangement as claimed in claim 1, wherein the count signal generating means are to selectively supply different arrays of subsequent different count signals with a substantially fixed supply rate, characterized in that the count signal generating means are further to selectively supply the different arrays of subsequent different count signals, such that the difference in value between subsequent count signals in the selected array of subsequent different count signals is substantially proportional to the transport velocity of the record carrier during recording.

3. Arrangement as claimed in claim 1, characterized in that the count signal generating means are further to supply the at least one array of subsequent different count signals with a supply rate which is substantially proportional to the transport velocity of the record carrier during recording.

4. Arrangement as claimed in claim 1, characterized in that, for recording a first information signal in a first portion located at the beginning of the record carrier, the count signal generating means are to generate the at least one array of subsequent different count signals with incrementally increasing values from a starting value, which is preferably zero.

5. Arrangement as claimed in claim 1, in which a first information signal has been recorded in a first portion on the record carrier, characterized in that for recording a second information signal directly after the first information signal in a second portion on the record carrier, the arrangement further comprises means for reading the count signal lastly recorded in the first portion on the record carrier, and means for supplying a value of the count signal lastly recorded to the count signal generating means, wherein for recording the second information signal, the count signal generating means are to generate the at least one array of subsequent different count signals with incrementally increasing values starting from the value of the count signal lastly recorded in the first portion.

6. Arrangement as claimed in claim 1, characterized in that, the recording means are adapted to record the processed information signal and the count signals in the same track on the record carrier.

7. Arrangement for recording an information signal in tracks on a record carrier, comprising:
an input for receiving the information signal;
signal processing means for processing the information signal such that it can be recorded in the tracks;
count signal generating means for generating at least one array of subsequent different count signals and for supplying the at least one array of subsequent different count signals to an output with a certain supply rate;
recording means for recording the information signal processed by said signal processing means in the tracks on the record carrier, and for recording the count signals in the tracks on the record carrier, said recording means having at least one recording head; and
transport means for transporting the record carrier with a certain transport velocity in a longitudinal direction of the record carrier, characterized in that, the arrangement is to receive a first information signal in the form of a video signal based on 25 pictures per second or a second information signal in the form of a video signal based on 30 pictures per second and to record said first or second information signal in slant tracks on the record carrier, the arrangement further comprising clock extracting means for extracting a clock signal from the first or second information signal applied to the input and for supplying the clock signal to an output, the clock signal being substantially proportional to the number of pictures per second in the first or second information signal, the output of the clock extraction means being coupled to a clock signal input of the count signal generating means, the count signal generating means are to supply the at least one array of subsequent different count signals in response to the clock signal received, with a supply rate which is substantially proportional to the frequency of the clock signal, and with a difference in value between subsequent different count signals such that the following relation is met, independent of the first or the second information signal being recorded on the record carrier and with the transport velocity of the record carrier during recording of said first or second information signal being the same:

$$F_s \times D = \text{constant},$$

where $F_s$ is the supply rate and $D$ is the difference in value between subsequent different count signals.

8. Arrangement as claimed in claim 7, characterized in that, the following relation is met $$F_s \times D/v_t = \text{constant},$$

where $v_t$ is the transport velocity of the record carrier during recording of said first or second information signal.

9. Arrangement as claimed in claim 2, characterized in that, for recording a first information signal in a first portion located at the beginning of the record carrier, the count signal generating means are to generate the at least one array of subsequent different count signals with incrementally increasing values from a starting value, which is preferably zero.

10. Arrangement as claimed in claim 3, characterized in that, for recording a first information signal in a first portion located at the beginning of the record carrier, the count signal generating means are to generate the at least one array of subsequent different count signals with incrementally increasing values from a starting value, which is preferably zero.

11. Arrangement as claimed in claim 2, in which a first information signal has been recorded in a first portion on the record carrier, characterized in that for recording a second information signal directly after the first information signal in a second portion on the record carrier, the arrangement further comprises means for reading the count signal lastly recorded in the first portion on the record carrier, and means for supplying a value of the count signal lastly recorded to the count signal generating means, wherein for recording the second information signal, the count signal generating means are to generate the at least one array of subsequent different count signals with incrementally increasing values starting from the value of the count signal lastly recorded in the first portion.

12. Arrangement as claimed in claim 3, in which a first information signal has been recorded in a first portion on the record carrier, characterized in that for recording a second information signal directly after the first information signal in a second portion on the record carrier, the arrangement further comprises means for reading the count signal lastly recorded in the first portion on the record carrier, and means for supplying a value of the count signal lastly recorded to the count signal generating means, wherein for recording the second information signal, the count signal generating means are to generate the at least one array of subsequent different count signals with incrementally increasing values starting from the value of the count signal lastly recorded in the first portion.

13. Arrangement as claimed in claim 4, in which a first information signal has been recorded in a first portion on the record carrier, characterized in that for recording a second information signal directly after the first information signal in a second portion on the record carrier, the arrangement further comprises means for reading the count signal lastly recorded in the first portion on the record carrier, and means for supplying a value of the count signal lastly recorded to the count signal generating means, wherein for recording the second information signal, the count signal generating means are to generate the at least one array of subsequent different count signals with incrementally increasing values starting from the value of the count signal lastly recorded in the first portion.

14. Arrangement as claimed in claim 9, in which a first information signal has been recorded in a first portion on the record carrier, characterized in that for recording a second information signal directly after the first information signal in a second portion on the record carrier, the arrangement further comprises means for reading the count signal lastly recorded in the first portion on the record carrier, and means for supplying a value of the count signal lastly recorded to the count signal generating means, wherein for recording the second information signal, the count signal generating means are to generate the at least one array of subsequent different count signals with incrementally increasing values starting from the value of the count signal lastly recorded in the first portion.

15. Arrangement as claimed in claim 10, in which a first information signal has been recorded in a first portion on the record carrier, characterized in that for recording a second information signal directly after the first information signal in a second portion on the record carrier, the arrangement further comprises means for reading the count signal lastly recorded in the first portion on the record carrier, and means for supplying a value of the count signal lastly recorded to the count signal generating means, wherein for recording the second information signal, the count signal generating means are to generate the at least one array of subsequent different count signals with incrementally increasing values starting from the value of the count signal lastly recorded in the first portion.

* * * * *